United States Patent
Kim et al.

(10) Patent No.: US 12,344,058 B1
(45) Date of Patent: Jul. 1, 2025

(54) STABILIZER BAR UNIT

(71) Applicants: Hyundai Motor Company, Seoul (KR); Kia Corporation, Seoul (KR)

(72) Inventors: JaeHun Kim, Hwaseong-si (KR); Eun Sik Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/823,979

(22) Filed: Sep. 4, 2024

(30) Foreign Application Priority Data

May 3, 2024 (KR) .................. 10-2024-0058845

(51) Int. Cl.
    *B60G 21/055* (2006.01)
    *B60G 11/23* (2006.01)
    *B60G 21/02* (2006.01)

(52) U.S. Cl.
    CPC ............ *B60G 11/23* (2013.01); *B60G 21/026* (2013.01); *B60G 21/0551* (2013.01); *B60G 2202/134* (2013.01); *B60G 2204/82* (2013.01); *B60G 2206/427* (2013.01)

(58) Field of Classification Search
CPC .......... B60G 21/0558; B60G 2206/427; B60G 2202/134; B60G 2202/135; B60G 21/0553; B60G 21/0556
See application file for complete search history.

(56) References Cited

U.S. PATENT DOCUMENTS

| 12,179,533 B1 * | 12/2024 | Kim ................ B60G 21/055 |
| 2010/0253019 A1 * | 10/2010 | Ogawa ............ B60G 21/0553 |
| | | 280/5.511 |
| 2018/0056748 A1 * | 3/2018 | Grimes .............. B60G 9/00 |

FOREIGN PATENT DOCUMENTS

| DE | 10107522 A1 * | 9/2002 | ............ B60G 11/15 |
| DE | 102007028852 A1 * | 12/2008 | ........ B60G 21/0555 |
| JP | 2003025821 A * | 1/2003 | |
| KR | 20070027977 A * | 3/2007 | |
| KR | 101229214 B1 * | 2/2013 | |
| KR | 20160047338 A * | 5/2016 | |
| KR | 20240066811 A | 5/2024 | |

OTHER PUBLICATIONS

Seong et al., Roll Stablilizer Assembly, May 2, 2016, KR 2016-0047338 A, Machine Translation of Description (Year: 2016).*
Ham Hyoung Seung, a Stabilizer Bar of an Automobile, Mar. 12, 2007, KR 2007-0027977 A, Machine Translation of Description (Year: 2007).*

* cited by examiner

*Primary Examiner* — James A English
(74) *Attorney, Agent, or Firm* — Slater Matsil, LLP

(57) ABSTRACT

A stabilizer bar device includes a main rigid member connected to suspension arms via links respectively coupled to both end portions, the main rigid member having a slot hole disposed along a longitudinal direction in a preset slot section, and a sub-rigid member having a first end coupled to the main rigid member and a second end inserted into the slot hole.

20 Claims, 14 Drawing Sheets

STABILIZER BAR UNIT

CROSS-REFERENCE TO RELATED APPLICATIONS

This application claims the benefit of Korean Patent Application No. 10-2024-0058845, filed on May 3, 2024, which application is hereby incorporated herein by reference.

TECHNICAL FIELD

The present invention relates to a suspension system of a vehicle.

BACKGROUND

Generally, a suspension system of a vehicle is installed between a vehicle body and wheels and is adapted to absorb vibrations of the vehicle body while the vehicle is driving.

The suspension system includes a solid shaft-type stabilizer bar that suppresses rolling while the vehicle is driving. Both sides of a middle part of the stabilizer bar are fixed to the vehicle body through mounting bushes, and both end portions of the stabilizer bar are fixed to a suspension arm through links.

Such a stabilizer bar does not work when the left and right wheels move up and down at the same time. However, when the left and right wheels move up and down relative to each other, the stabilizer bar is twisted and performs an anti-roll function of suppressing a roll motion of the vehicle body with torsional elastic force.

That is, when the vehicle body is tilted to an outer side of a turning direction due to centrifugal force while the vehicle is turning, or when the left and right wheels have a relative phase difference due to a bump or rebound while the vehicle is driving, the stabilizer bar is twisted to stabilize a posture of the vehicle body by the torsional elastic force.

However, the stabilizer bar has a constant stiffness value, so its torsional elastic force alone is insufficient to ensure turning stability under various conditions.

Accordingly, in recent years, an active roll control (ARC) or active roll stabilization (ARS), which actively controls the roll behavior of a vehicle by changing the stiffness value of the stabilizer bar according to driving conditions of the vehicle, has been developed and applied.

However, since such an active roll control device uses a large number of components such as left and right stabilizer bars and an actuator and a sliding unit connected to the stabilizer bars, it may cause an excessive increase in cost.

The matters described in the background section are prepared to enhance understanding of the background of embodiments of the invention, and they may include matters that are not already known.

SUMMARY

The present invention relates to a suspension system of a vehicle. Particular embodiments relate to a stabilizer bar unit of the suspension system.

Exemplary embodiments of the present invention provide a stabilizer bar unit adapted to effectively control the roll behavior of a vehicle by changing the roll stiffness with a simple configuration according to driving conditions of the vehicle.

A stabilizer bar unit according to an exemplary embodiment of the present invention may include i) a main rigid member connected to suspension arms via links respectively coupled to both end portions and having a slot hole formed along a longitudinal direction in a set slot section, and ii) a sub-rigid member arranged such that one end is fixed to the main rigid member and the other end is inserted into the slot hole.

Additionally, in the stabilizer bar unit according to an exemplary embodiment of the present invention, the sub-rigid member may include a fixing part fixed to the main rigid member, a lever part fixed to the fixing part at one end and arranged toward the slot hole along the longitudinal direction of the main rigid member, and a blade part formed integrally with the other end of the lever part and arranged in the slot hole at a distance from the fixing part set along the longitudinal direction of the main rigid member via the lever part.

Additionally, in the stabilizer bar unit according to an exemplary embodiment of the present invention, the fixing part may be provided in a form of a pipe surrounding the main rigid member and may be fixed to an outer peripheral surface of the main rigid member.

Additionally, in the stabilizer bar unit according to an exemplary embodiment of the present invention, the blade part may be provided in a form of a flat plate to be inserted into the slot hole.

Additionally, the stabilizer bar unit according to an exemplary embodiment of the present invention may further include iii) damping members respectively arranged on both inner wall surfaces of the slot hole in the longitudinal direction, with the blade part interposed therebetween.

Additionally, in the stabilizer bar unit according to an exemplary embodiment of the present invention, the blade part may be configured to come into close contact with one of the damping members along a torsion direction of the main rigid member.

Additionally, in the stabilizer bar unit according to an exemplary embodiment of the present invention, the blade part may be arranged with a set gap from the damping members.

Additionally, in the stabilizer bar unit according to an exemplary embodiment of the present invention, the blade part may be arranged to be in contact with the damping members.

Additionally, in the stabilizer bar unit according to an exemplary embodiment of the present invention, the damping members may include rubber dampers.

Additionally, the stabilizer bar unit according to an exemplary embodiment of the present invention may further include iv) a reinforcement bracket coupled to the slot section of the main rigid member.

Additionally, in the stabilizer bar unit according to an exemplary embodiment of the present invention, the reinforcement bracket may be provided in a form of a pipe surrounding the slot section.

Additionally, in the stabilizer bar unit according to an exemplary embodiment of the present invention, the reinforcement bracket may be formed with a slit so that the slot hole is able to be in an open state.

Additionally, in the stabilizer bar unit according to an exemplary embodiment of the present invention, the reinforcement bracket may be provided in a form of a pipe having a length longer than a section length of the slot section.

Additionally, in the stabilizer bar unit according to an exemplary embodiment of the present invention, the sub-rigid member may be arranged so that a midpoint, in the longitudinal direction, of the sub-rigid member coincides with a midpoint, in the longitudinal direction, of the main rigid member.

According to the stabilizer bar unit according to an exemplary embodiment of the present invention, the roll behavior of the vehicle can be controlled by changing the roll stiffness value with a simple configuration according to the driving conditions of the vehicle, so manufacturing costs such as material costs can be reduced.

In addition, the effects that can be obtained or expected by the exemplary embodiments of the present invention will be directly or implicitly disclosed in the detailed description of the exemplary embodiments of the present invention. That is, various effects that may be expected by the exemplary embodiments of the present invention will be disclosed in the detailed description described below.

BRIEF DESCRIPTION OF THE DRAWINGS

Since the accompanying drawings are for reference in describing exemplary embodiments of the present invention, the technical spirit of the present invention should not be construed as being limited to the accompanying drawings.

It should be understood that the above-referenced drawings are not necessarily drawn to scale and present rather simplified representations of various preferred features illustrating the basic principles of embodiments of the present invention. The specific design features of embodiments of the present invention, including, for example, specific dimensions, orientations, locations, and shapes, will be determined in part by the specific intended application and use environment.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing specific exemplary embodiments only and is not intended to be limiting of the present disclosure. As used herein, the singular forms are intended to include the plural forms as well, unless the context clearly indicates otherwise.

It will be further understood that the terms "comprise" and/or "comprising" when used in this specification specify the presence of stated features, integers, steps, operations, elements, and/or components, but they do not preclude the presence or addition of one or more other features, integers, steps, operations, components, and/or groups thereof.

As used herein, the term "and/or" includes any one or all combinations of one or more of associated listed items.

In the present specification, the term "coupled" indicates a physical relationship between two components that are directly connected to each other by welding, rivet, self piercing rivet (SPR), flow drill screw (FDS), structural adhesive, or the like, or indirectly through one or more intermediary components.

As used herein, "vehicle," "vehicular," "automobile," or other similar terms used herein generally refer to passenger automobiles including passenger vehicles, sport utility vehicles (SUVs), buses, trucks, and various commercial vehicles, and include hybrid vehicles, electric vehicles, hybrid electric vehicles, electric vehicle-based purpose built vehicles (PBVs), hydrogen-powered vehicles, and other alternative fuel vehicles (for example, fuels derived from resources other than petroleum).

Hereinafter, exemplary embodiments of the present invention will be described in detail with reference to the accompanying drawings.

Figure 1:
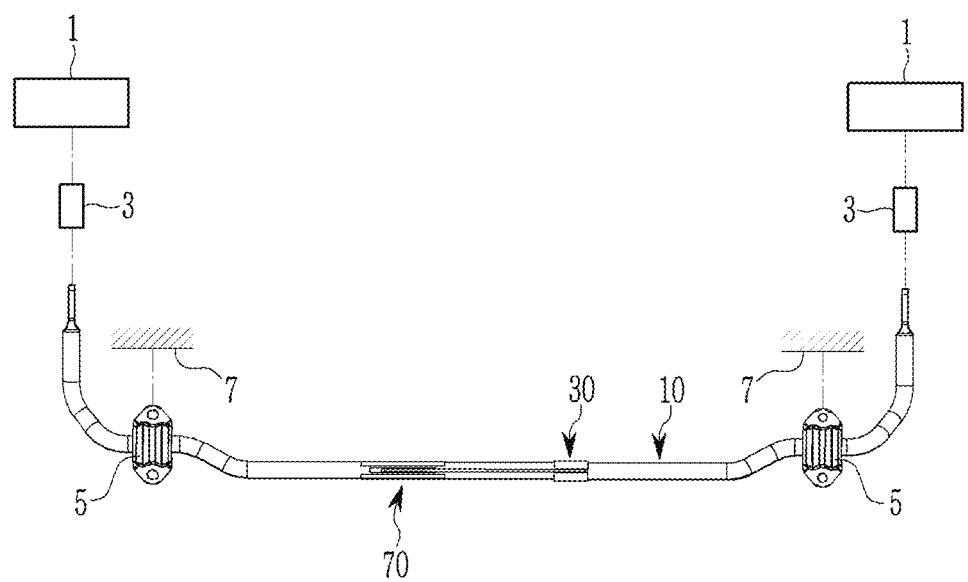
FIG. 1 is a plan view showing a stabilizer bar unit according to an exemplary embodiment of the present invention.

FIG. 1 is a plan view showing a stabilizer bar unit according to an exemplary embodiment of the present invention.

Referring to FIG. 1, a stabilizer bar unit 100 according to an exemplary embodiment of the present invention can be applied to a suspension system of a vehicle (or automobile) as described above.

Furthermore, the stabilizer bar unit 100 according to an exemplary embodiment of the present invention can be applied to a front wheel suspension system and a rear wheel suspension system of a vehicle.

The stabilizer bar unit 100 according to an exemplary embodiment of the present invention is connected to left and right suspension arms 1 of the suspension system through links 3 (commonly referred to as a 'step bar link' by one skilled in the art). Here, the suspension arm 1 may include a lower arm of the suspension system.

The stabilizer bar unit 100 according to an exemplary embodiment of the present invention is fixed to a vehicle body 7, for example, a sub-frame, through left and right mounting bushes 5.

In the present specification, the reference directions for describing the following components may be set based on the vehicle body, including the front-rear direction of the vehicle body (for example, the longitudinal direction of the vehicle body), the vehicle width direction (for example, the left-right direction of the vehicle body), and the up-down direction (for example, the height direction of the vehicle body).

In the present specification, "upper end portion," "upper portion," "upper end," or "upper surface" of a constitutional element indicates an end portion, a portion, an end, or a surface of a constitutional element located on a relatively upper side in the drawing, and "lower end portion," "lower portion," "lower end," or "lower surface" of a constitutional element indicates an end portion, a portion, an end, or a surface of a constitutional element located on a relatively lower side in the drawing.

Furthermore, in the present specification, an end of a constitutional element (for example, one-side end or other-side end, both ends, or the like) refers to an end of a constitutional element in any one direction, and an end portion of a constitutional element (for example, one-side end portion, other-side end portion, both end portions, front end portion, rear end portion, or the like) indicates a certain portion of a constitutional element that includes the end.

The stabilizer bar unit 100 according to an exemplary embodiment of the present invention provides a structure that can control the roll behavior of a vehicle by changing the roll stiffness with a simple configuration according to driving conditions of the vehicle.

Figure 2:
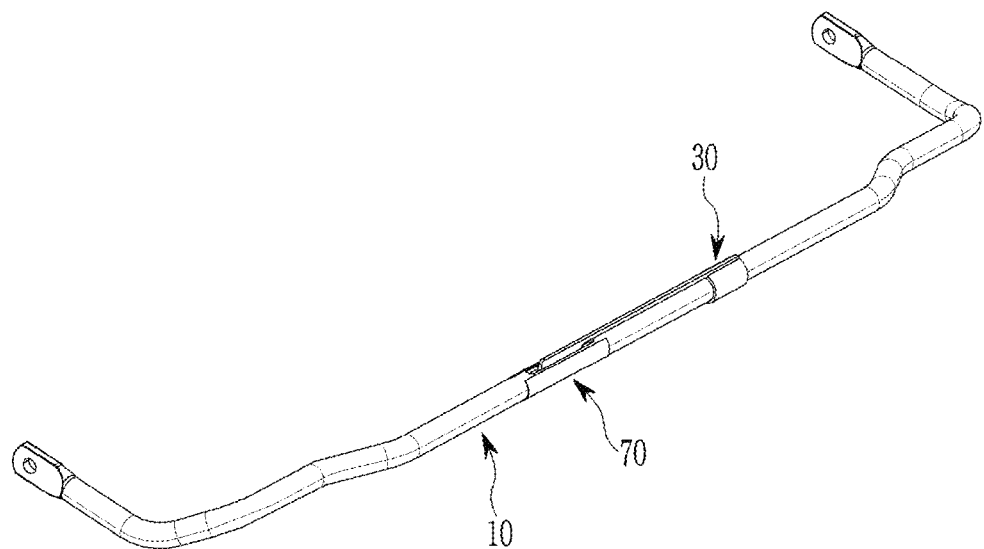
FIG. 2 is an assembled perspective view showing the stabilizer bar unit according to an exemplary embodiment of the present invention.
Figure 3:
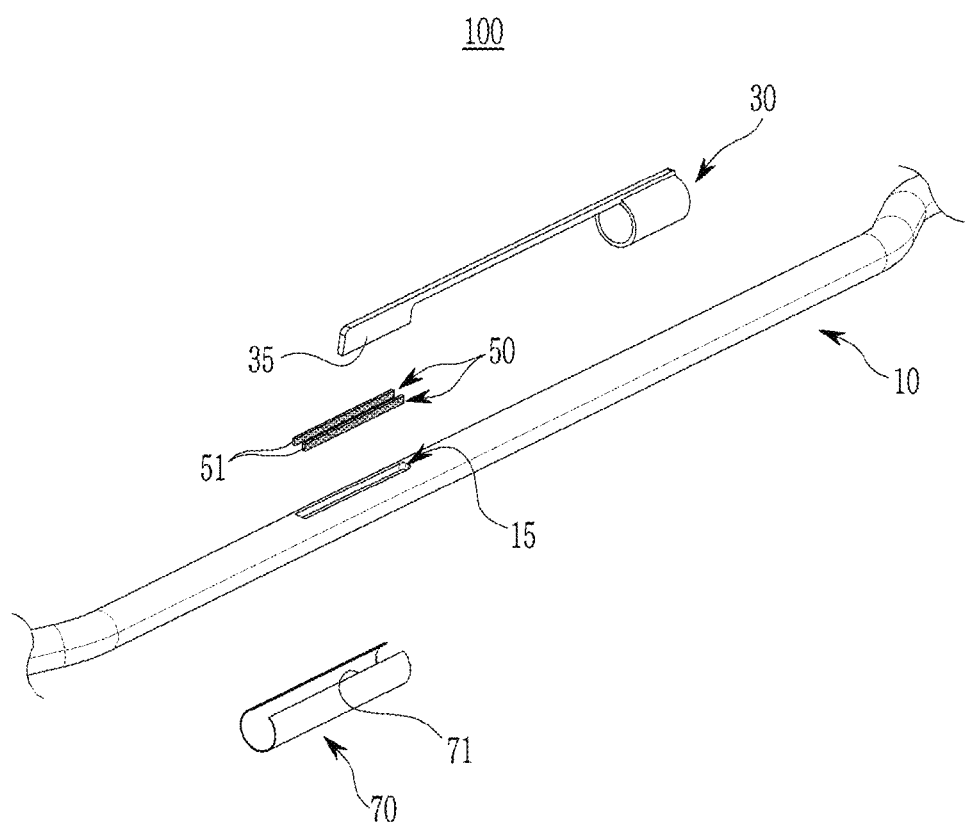
FIG. 3 is an exploded perspective view showing the stabilizer bar unit according to an exemplary embodiment of the present invention.
Figure 4:
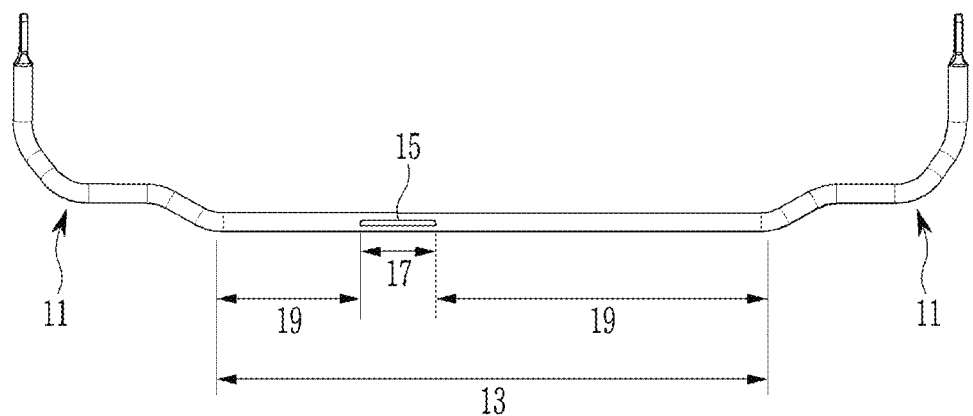
FIG. 4 is a plan view showing a main rigid member applied to the stabilizer bar unit according to an exemplary embodiment of the present invention.

FIG. 2 is an assembled perspective view showing the stabilizer bar unit according to an exemplary embodiment of the present invention, FIG. 3 is an exploded perspective view showing the stabilizer bar unit according to an exemplary embodiment of the present invention, and FIG. 4 is a plan view showing a main rigid member applied to the stabilizer bar unit according to an exemplary embodiment of the present invention.

Referring to FIGS. 1 to 4, the stabilizer bar unit 100 includes a main rigid member 10, a sub-rigid member 30, damping members 50, and a reinforcement bracket 70.

In an exemplary embodiment of the present invention, the main rigid member 10 may be provided in a form of a single bar arranged along the vehicle width direction. Furthermore, in an example, the main rigid member 10 may be provided as a hollow type (or as having a cross-sectional shape of a pipe). Without being limited thereto, the main rigid member 10 may be provided as a solid shaft type.

As shown in FIG. 4, the main rigid member 10 according to an exemplary embodiment of the present invention includes bent parts 11 formed at both end portions and a straight part 13 connecting the bent parts 11 along the vehicle width direction.

The bent parts 11 may be connected to the left and right suspension arms 1 of the suspension system via the links 3. Both sides of the straight part 13 may be fixed to the vehicle body 7 via the left and right mounting bushes 5.

Such a main rigid member 10 includes a slot hole 15 formed in the straight part 13 along the longitudinal direction.

In an example, the slot hole 15 may be formed in a shape of a long hole in the hollow-type straight part 13. Such a slot hole 15 is formed in a slot section 17 of the straight part 13 demarcated along the longitudinal direction of the main rigid member 10.

Furthermore, the straight part 13 may further include cylinder sections 19 with a cylindrical cross-section extending from the slot section 17 to both end portions, that is, the bent parts 11 of the main rigid member 10.

Referring to FIGS. 1 to 4, in an exemplary embodiment of the present invention, the sub-rigid member 30 is adapted to change the roll stiffness of the main rigid member 10 according to the driving conditions of the vehicle.

The sub-rigid member 30 may provide additional roll stiffness (for example, torsional torque) to the main rigid member 10 when the main rigid member 10 is torsionally deformed.

Such a sub-rigid member 30 is arranged on the main rigid member 10 along the longitudinal direction, and in an example, may be provided as a cantilever type. That is, the sub-rigid member 30 may be arranged such that one end of the sub-rigid member 30 is fixed to the main rigid member 10 and the other end of the sub-rigid member 30 is inserted into the slot hole 15.

Figure 5:
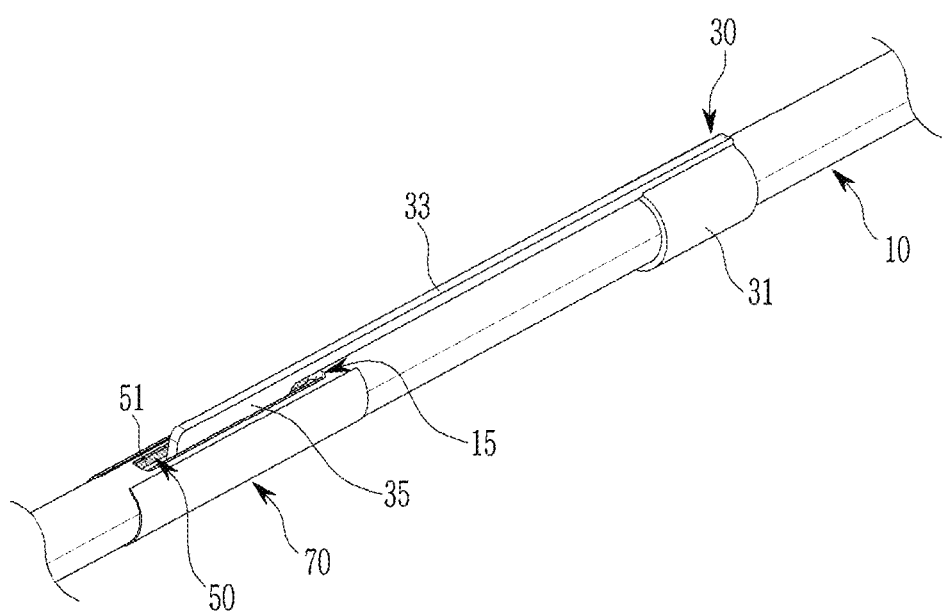
FIGS. 5 and 6 are views showing a coupled structure of the main rigid member and a sub-rigid member applied to the stabilizer bar unit according to an exemplary embodiment of the present invention.
Figure 6:
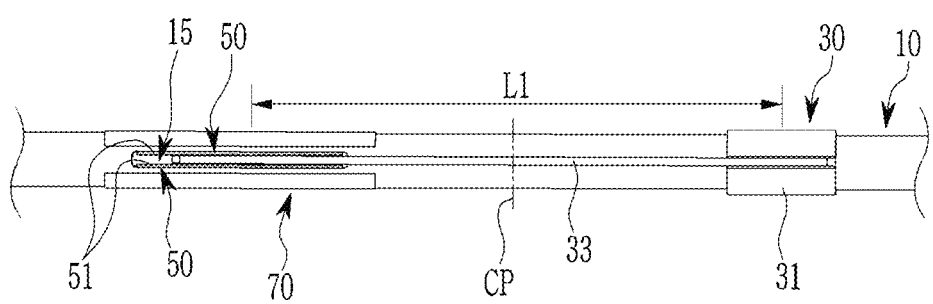
Figure 7:
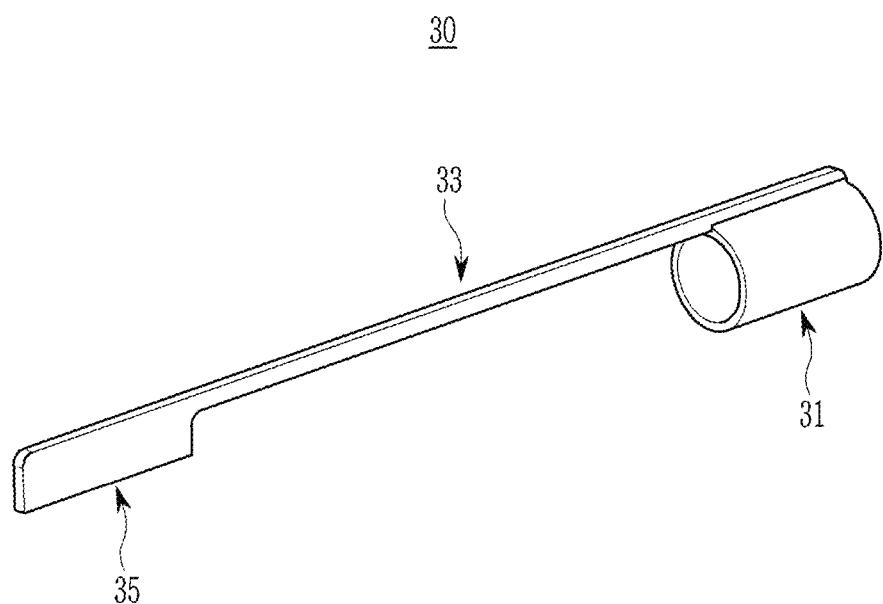
FIG. 7 is a perspective view showing the sub-rigid member applied to the stabilizer bar unit according to an exemplary embodiment of the present invention.

FIGS. 5 and 6 are views showing a coupled structure of the main rigid member and the sub-rigid member applied to the stabilizer bar unit according to an exemplary embodiment of the present invention, and FIG. 7 is a perspective view showing the sub-rigid member applied to the stabilizer bar unit according to an exemplary embodiment of the present invention.

Referring to FIGS. 5 to 7, the sub-rigid member 30 according to an exemplary embodiment of the present invention includes a fixing part 31, a lever part 33, and a blade part 35.

The fixing part 31 is fixed to the main rigid member 10. The fixing part 31 is, in an example, fixed to the cylinder section 19 (see FIG. 4) of the straight part 13 (see FIG. 4) of the main rigid member 10. Here, the fixing part 31 may be fixed to the cylinder section 19 extending from the slot section 17 (see FIG. 4) to one bent part 11 (see FIG. 4) of the main rigid member 10.

In another example, the fixing part 31 is provided in a shape of a pipe surrounding the main rigid member 10. The fixing part 31 may be fixed to an outer peripheral surface of the main rigid member 10 or, further, to an outer peripheral surface of the cylinder section 19 by welding.

The lever part 33 is fixed to the fixing part 31 and is arranged toward the slot hole 15 along the longitudinal direction of the main rigid member 10. Here, one end of the lever part 33 is fixed to the fixing part 31. Accordingly, one end of the lever part 33 may be defined as a fixed end portion fixed to the fixing part 31, and the other end of the lever part 33 may be defined as a free end portion.

The blade part 35 may be formed integrally with the free end portion of the lever part 33, or it may be separately coupled to the free end portion of the lever part 33. In an example, the blade part 35 may be provided in a shape of a flat plate that is inserted into the slot hole 15.

The blade part 35 is arranged in the slot hole 15 at a distance L1 from the fixing part 31 set along the longitudinal direction of the main rigid member 10 via the lever part 33.

Furthermore, the sub-rigid member 30 as described above may be arranged so that a midpoint CP, in the longitudinal direction, of the sub-rigid member coincides with a midpoint CP, in the longitudinal direction, of the main rigid member 10, as shown in FIG. 6.

Referring to FIGS. 1 to 3, in an exemplary embodiment of the present invention, the damping members 50 are adapted to control torsional torque transmitted to the main rigid member 10 via the blade part 35 of the sub-rigid member 30.

The damping members 50 are coupled to the main rigid member 10 at positions corresponding to the blade part 35.

Furthermore, the damping members 50 are coupled to edges of the slot hole 15 of the main rigid member 10.

Figure 8:
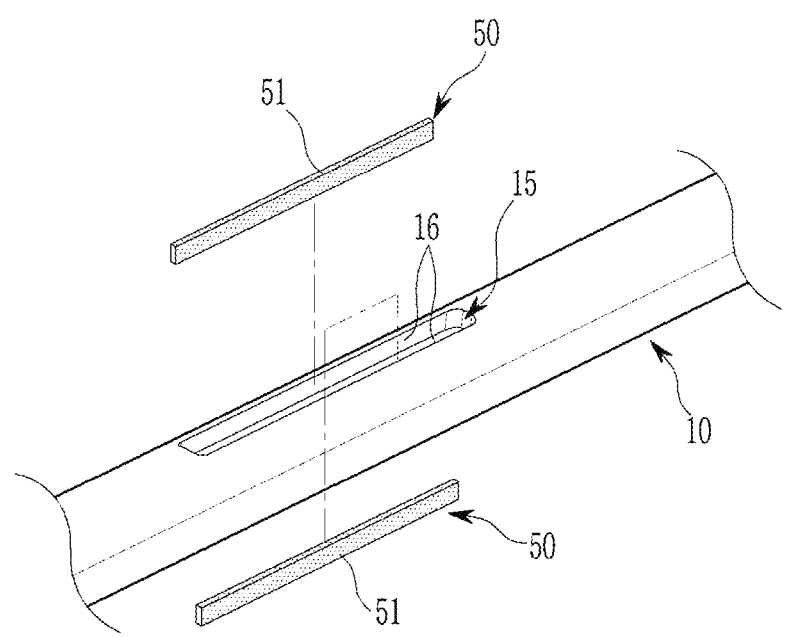
FIG. 8 is an exploded perspective view showing a damping member applied to the stabilizer bar unit according to an exemplary embodiment of the present invention.
Figure 9:
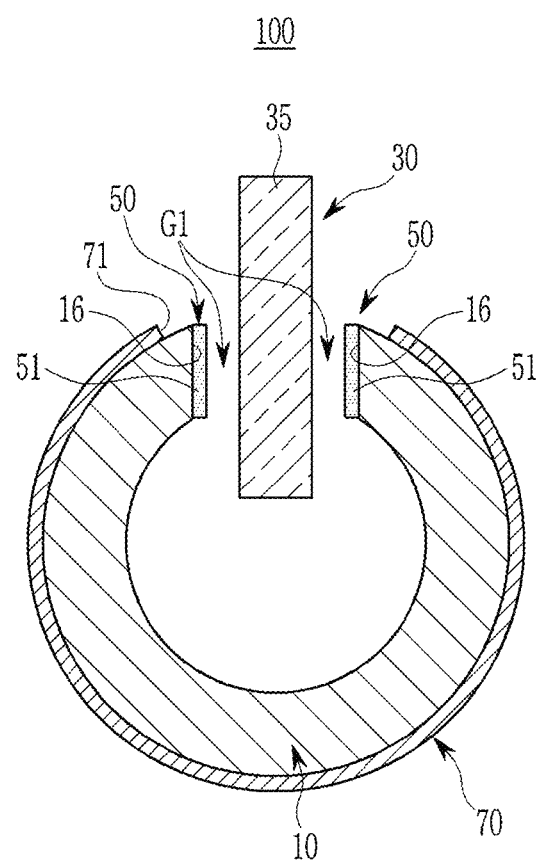
FIG. 9 is a cross-sectional view showing the stabilizer bar unit according to an exemplary embodiment of the present invention.

FIG. 8 is an exploded perspective view showing a damping member applied to the stabilizer bar unit according to an exemplary embodiment of the present invention, and FIG. 9 is a cross-sectional view showing the stabilizer bar unit according to an exemplary embodiment of the present invention.

Referring to FIGS. 8 and 9, the damping members 50 according to an exemplary embodiment of the present invention are respectively arranged on both inner wall surfaces 16 of the slot hole 15 in the longitudinal direction, with the blade part 35 of the sub-rigid member 30 interposed between the damping members 50 in the slot hole 15 of the main rigid member 10.

Each of the damping members 50 may include, in an example, a rubber damper 51. Such rubber dampers 51 may be adhesively coupled to both inner wall surfaces 16 of the slot hole 15.

Here, the blade part 35 of the sub-rigid member 30 is arranged with a set gap G1 from the damping members 50 in an inner region of the slot hole 15. The blade part 35 may come into close contact with one of the damping members 50 along a torsion direction of the main rigid member 10.

Referring to FIGS. 1 to 9, in an exemplary embodiment of the present invention, the reinforcement bracket 70 is adapted to reinforce the stiffness of the main rigid member 10.

Figure 10:
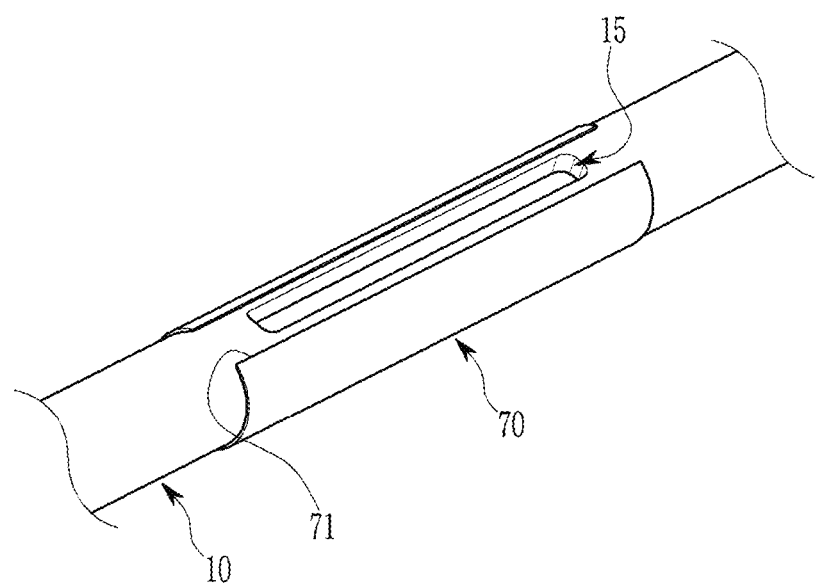
FIG. 10 is a perspective view showing a coupled structure of a reinforcement bracket applied to the stabilizer bar unit according to an exemplary embodiment of the present invention.
Figure 11:
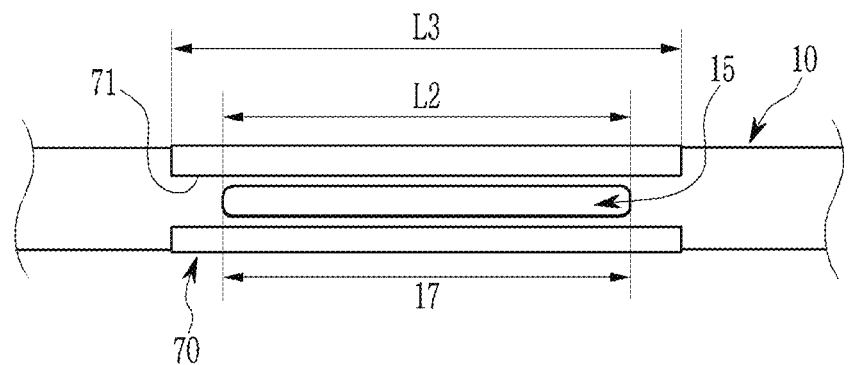
FIG. 11 is a plan view showing the coupled structure of the reinforcement bracket applied to the stabilizer bar unit according to an exemplary embodiment of the present invention.

FIG. 10 is a perspective view showing a coupled structure of a reinforcement bracket applied to the stabilizer bar unit according to an exemplary embodiment of the present invention, and FIG. 11 is a plan view showing the coupled structure of the reinforcement bracket applied to the stabilizer bar unit according to an exemplary embodiment of the present invention.

Referring to FIGS. 9 to 11, the reinforcement bracket 70 according to an exemplary embodiment of the present invention is coupled to the slot section 17 of the main rigid member 10.

The reinforcement bracket 70 is provided in a shape of a pipe surrounding the slot section 17. In an example, the reinforcement bracket 70 may be coupled to an outer peripheral surface of the slot section 17 by welding.

The reinforcement bracket 70 is formed with a slit 71 (also shown in FIG. 3) so that the slot hole 15 of the main rigid member 10 can be in an open state.

Here, the reinforcement bracket 70 may be coupled to the outer peripheral surface of the slot section 17 over a length L3 longer than a section length L2 of the slot section 17.

The reason why the length L3 of the reinforcement bracket 70 is set to be longer than the section length L2 of the slot section 17 is for dispersing stress concentrated on the slot section 17 during torsional deformation of the main rigid member 10.

Hereinafter, the assembly structure of the stabilizer bar unit 100 according to an exemplary embodiment of the present invention configured as described above will be described in detail with reference to FIGS. 1 to 11.

First, referring to FIGS. 1 to 11, in an exemplary embodiment of the present invention, the main rigid member 10 is connected to the left and right suspension arms 1 of the suspension system via the links 3 coupled to the bent parts 11.

In addition, the main rigid member 10 is connected to the vehicle body 7 via the left and right mounting bushes 5 coupled to both sides of the straight part 13.

Here, the slot hole 15 is formed in the slot section 17 of the straight part 13 along the longitudinal direction of the main rigid member 10.

Additionally, in an exemplary embodiment of the present invention, the sub-rigid member 30 including the fixing part 31, the lever part 33, and the blade part 35 is coupled to the main rigid member 10.

The fixing part 31 is fixed to the cylinder section 19 extending from the slot section 17 of the main rigid member 10 to one bent part 11. The lever part 33 is fixed to the fixing part 31 along the longitudinal direction of the main rigid member 10. The blade part 35 is formed at the free end portion of the lever part 33 and is inserted into the slot hole 15 of the main rigid member 10.

Furthermore, in an exemplary embodiment of the present invention, the damping members 50 are coupled to both inner wall surfaces 16 of the slot hole 15 along the longitudinal direction, respectively. Here, the blade part 35 of the sub-rigid member 30 is arranged with the set gap G1 from the damping members 50 in the inner region of the slot hole 15.

Furthermore, in an exemplary embodiment of the present invention, the reinforcement bracket 70 is coupled to the slot section 17 of the main rigid member 10. Here, the reinforcement bracket 70 opens the slot hole 15 through the slit 71.

The operation of the stabilizer bar unit 100 according to an exemplary embodiment of the present invention assembled in this way will be described in detail with reference to FIGS. 12 and 13.

First, when the wheels move up and down (for example, a bump or rebound) during straight driving of the vehicle, the main rigid member 10 is twisted, and the roll motion of the vehicle body can be suppressed by the torsional spring force generated at this time.

Figure 12:
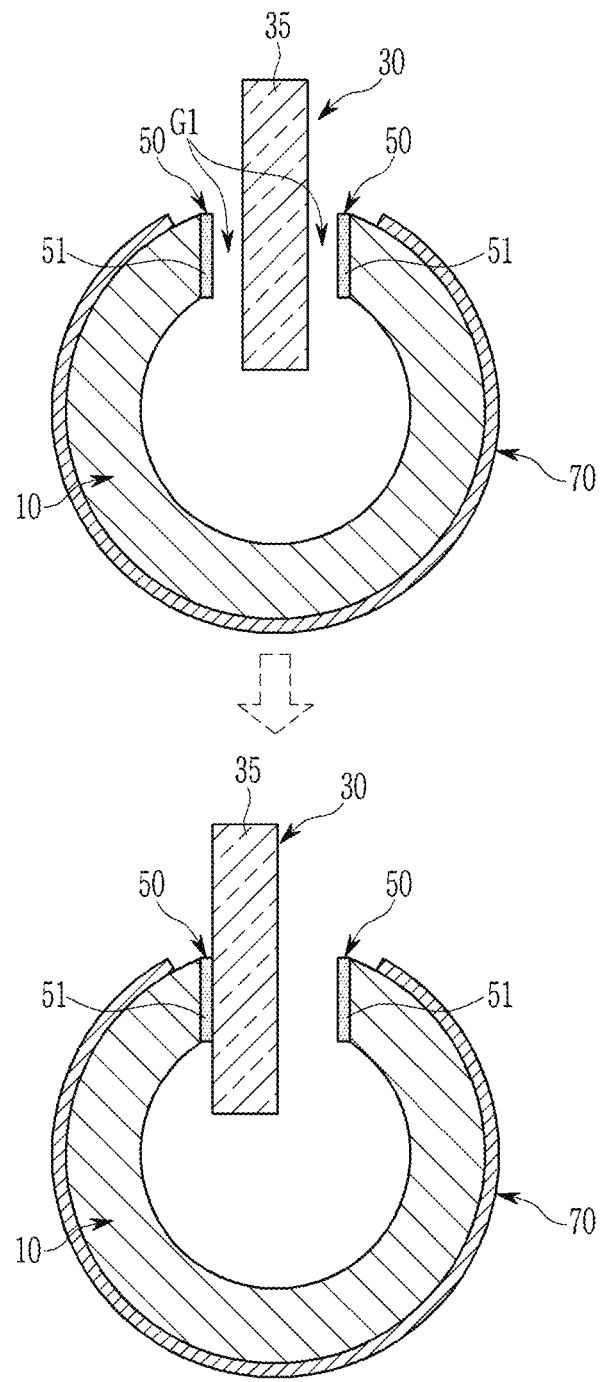
FIGS. 12 and 13 are views for illustrating an action of the stabilizer bar unit according to an exemplary embodiment of the present invention.

In this case, as shown in FIG. 12, the blade part 35 of the sub-rigid member 30 does not contact the damping members 50 in the inner region of the slot hole 15 and is located with the set gap G1 from the damping members 50.

Figure 13:
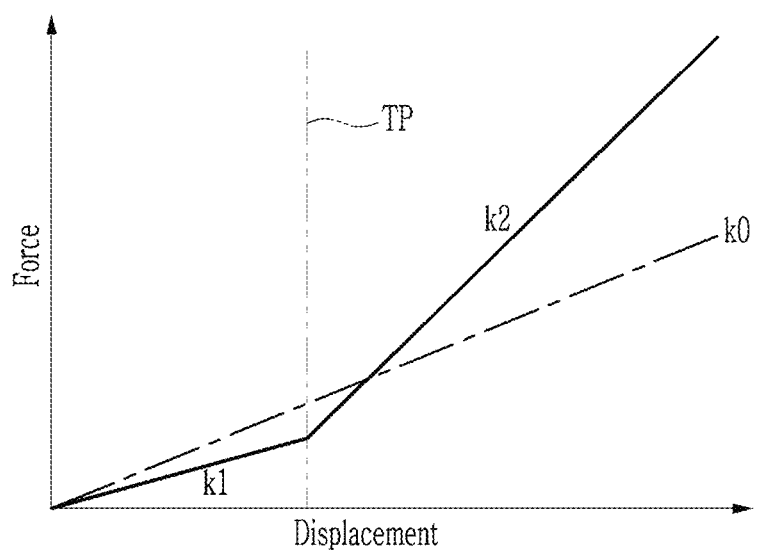

Here, when the vehicle drives straight, the roll stiffness value according to the displacement of the main rigid member 10 is referred to as 'k', as shown in FIG. 13. 'k0' as shown in FIG. 13 indicates the roll stiffness value according to the displacement of a solid shaft type stabilizer bar of the prior art.

Accordingly, in the case described above, k1 is smaller than k0 because the main rigid member 10 is provided as a hollow type and the slot hole 15 is formed. Accordingly, road noise caused during the straight driving of the vehicle can be reduced.

On the other hand, even when the vehicle turns, the main rigid member 10 is twisted, and the roll motion of the vehicle body can be suppressed by the torsional spring force generated at this time.

In this case, as shown in FIG. 12, the blade part 35 of the sub-rigid member 30 comes into close contact with one of the damping members 50 along the torsion direction of the main rigid member 10 in the inner region of the slot hole 15.

Accordingly, the sub-rigid member 30 is torsionally deformed together with the main rigid member 10 by the blade part 35 in close contact with one of the damping members 50.

Here, when the vehicle turns, the roll stiffness value according to the displacement of the main rigid member 10 is referred to as 'k2', as shown in FIG. 13. k2 may be defined as a dual stiffness value of the main rigid member 10 and the sub-rigid member 30.

Therefore, in this case, since k2 is greater than k0 and k1 due to the main rigid member 10 and the sub-rigid member 30, the roll motion of the vehicle body can be suppressed, the stable driving can be induced, and a comfortable ride quality can be provided to an occupant.

On the other hand, when the main rigid member 10 is torsionally deformed as described above, the reinforcement bracket 70 disperses the stress concentrated on the slot section 17 and can improve the durability of the main rigid member 10 because it is coupled to the outer peripheral surface of the slot section 17 over the length L3 longer than the section length L2 of the slot section 17.

On the other hand, as shown in FIG. 13, the point where k1 changes to k2 (for example, the inflection point of the roll stiffness) may be defined as a spring force transition point TP. That is, the spring force transition point TP may be defined as a position where the blade part 35 comes into close contact with one of the damping members 50.

The spring force transition point TP may be determined by the gap G1 between the blade part 35 and the damping members 50. Accordingly, the spring force transition point TP can be changed by adjusting the gap G1.

Furthermore, the displacement of the blade part 35 increases as the distance L1 between the fixing part 31 and the blade part 35 increases. Accordingly, the spring force transition point TP can be changed by adjusting the distance L1.

The stabilizer bar unit 100 according to an exemplary embodiment of the present invention as described so far can implement double roll stiffness by the main rigid member 10 and the sub-rigid member 30.

Therefore, the stabilizer bar unit 100 according to an exemplary embodiment of the present invention can effectively control the roll behavior of the vehicle by changing the roll stiffness value with a simple configuration according to the driving conditions of the vehicle.

Furthermore, compared to the ARC or ARS of the prior art, the stabilizer bar unit 100 according to an exemplary embodiment of the present invention can enable components such as stabilizer bars separated from each other, an actuator, and a sliding unit to be omitted.

Accordingly, manufacturing costs such as material costs can be reduced, and thus the stabilizer bar unit 100 according to an exemplary embodiment of the present invention can be applied to various vehicles at low cost.

Figure 14:
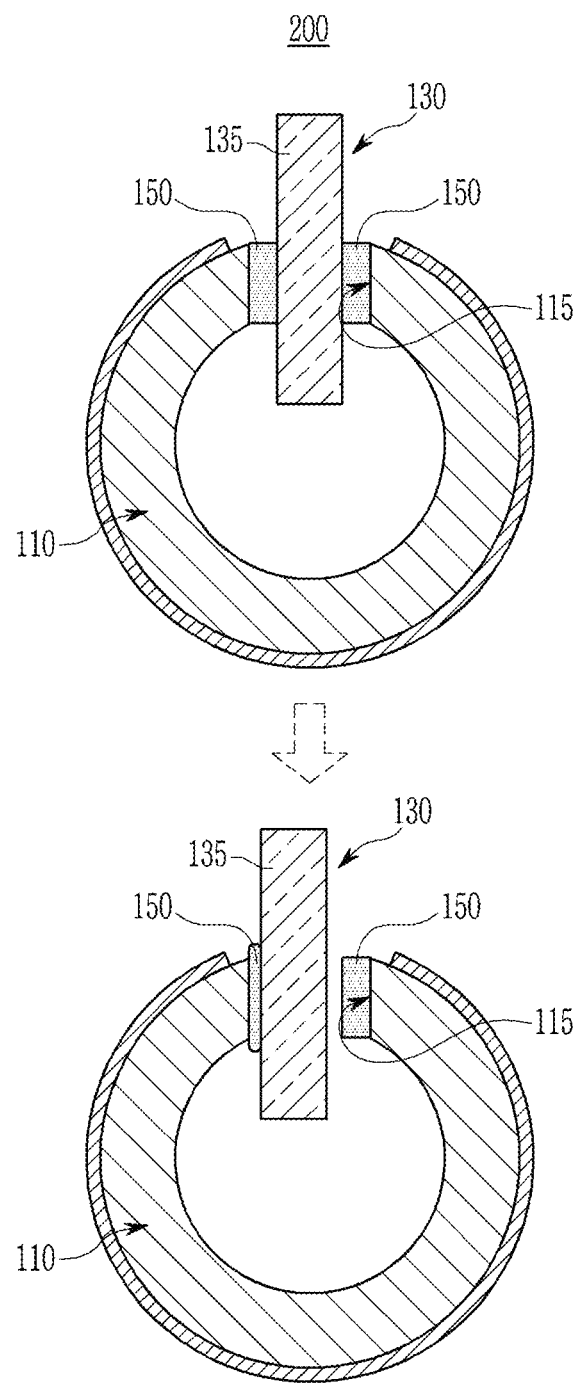
FIG. 14 is a cross-sectional view showing a stabilizer bar unit according to another exemplary embodiment of the present invention.

FIG. 14 is a cross-sectional view showing a stabilizer bar unit according to another exemplary embodiment of the present invention.

Referring to FIG. 14, according to a stabilizer bar unit 200 according to another exemplary embodiment of the present invention, a blade part 135 of a sub-rigid member 130 may be arranged to be in contact with damping members 150 in an inner region of a slot hole 115 of a main rigid member 110.

Accordingly, when the vehicle turns, the blade part 135 comes into close contact with one of the damping members 150 along the torsion direction of the main rigid member 110 and is spaced apart from the other one.

Here, the adhesion force (or contact force) of the blade part 135 with one damping member 150 increases, and one damping member 150 can be compressed by the blade part 135.

According to the stabilizer bar unit 200 according to another exemplary embodiment of the present invention configured as described above, there is no need to manage the gap between the blade part 135 and the damping members 150, so mass productivity can be improved.

Since the other configurations and operations of the stabilizer bar unit 200 according to another exemplary embodiment of the present invention as described above are the same as in the previous exemplary embodiment, further detailed description is omitted in the present specification.

While embodiments of this invention have been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

The following reference identifiers may be used in connection with the drawings to describe various features of embodiments of the present invention.

| | |
|---|---|
| 1: suspension arm | 3: link |
| 5: mounting bush | 7: vehicle body |
| 10, 110: main rigid member | 11: bent part |
| 13: straight part | 15, 115: slot hole |
| 16: inner wall surface | 17: slot section |
| 19: cylinder section | 30, 130: sub-rigid member |
| 31: fixing part | 33: lever part |
| 35, 135: blade part | 50, 150: damping member |
| 51: rubber damper | 70: reinforcement bracket |
| 71: slit | 100, 200: stabilizer bar unit |

What is claimed is:

1. A stabilizer bar device comprising:
 a main rigid member connected to suspension arms via links respectively coupled to both end portions, the main rigid member having a slot hole disposed along a longitudinal direction in a preset slot section; and
 a sub-rigid member having a first end coupled to the main rigid member and a second end inserted into the slot hole, wherein the sub-rigid member comprises:
  a fixing part coupled to the main rigid member;
  a lever part having a first end coupled to the fixing part and disposed toward the slot hole along the longitudinal direction of the main rigid member; and
  a blade part integral with a second end of the lever part and disposed in the slot hole at a predetermined distance from the fixing part along the longitudinal direction of the main rigid member via the lever part.

2. The stabilizer bar device of claim 1, wherein the fixing part is in a form of a pipe surrounding the main rigid member and is coupled to an outer peripheral surface of the main rigid member.

3. The stabilizer bar device of claim 1, wherein the blade part is in a form of a flat plate configured to be inserted into the slot hole.

4. The stabilizer bar device of claim 1, further comprising damping members respectively arranged on both inner wall surfaces of the slot hole in the longitudinal direction, wherein the blade part is interposed therebetween.

5. The stabilizer bar device of claim 4, wherein the blade part is configured to come into close contact with one of the damping members along a torsion direction of the main rigid member.

6. The stabilizer bar device of claim 4, wherein the blade part is separated from each of the damping members by a predetermined gap.

7. The stabilizer bar device of claim 4, wherein the blade part is disposed in contact with the damping members.

8. The stabilizer bar device of claim 4, wherein the damping members comprise rubber dampers.

9. A stabilizer bar device comprising:
a main rigid member connected to suspension arms via links respectively coupled to both end portions, the main rigid member having a slot hole disposed along a longitudinal direction in a preset slot section; and
a sub-rigid member having a first end coupled to the main rigid member and a second end inserted into the slot hole, wherein the sub-rigid member is disposed so that a midpoint of the sub-rigid member in the longitudinal direction coincides with a midpoint of the main rigid member in the longitudinal direction.

10. The stabilizer bar device of claim 9, wherein the sub-rigid member comprises:
a fixing part coupled to the main rigid member;
a lever part having a first end coupled to the fixing part and disposed toward the slot hole along the longitudinal direction of the main rigid member; and
a blade part integral with a second end of the lever part and disposed in the slot hole at a predetermined distance from the fixing part along the longitudinal direction of the main rigid member via the lever part.

11. The stabilizer bar device of claim 10, wherein:
the fixing part is in a form of a pipe surrounding the main rigid member and is coupled to an outer peripheral surface of the main rigid member; and
the blade part is in a form of a flat plate configured to be inserted into the slot hole.

12. A stabilizer bar device comprising:
a main rigid member connected to suspension arms via links respectively coupled to both end portions, the main rigid member having a slot hole disposed along a longitudinal direction in a preset slot section;
a sub-rigid member having a first end coupled to the main rigid member and a second end inserted into the slot hole; and
a reinforcing bracket coupled to the slot section of the main rigid member, wherein the reinforcement bracket is in a form of a pipe surrounding the slot section and comprises a slit corresponding to the slot hole such that the slot hole is in an open state in a state in which the reinforcement bracket is coupled to the main rigid member.

13. The stabilizer bar device of claim 12, wherein a length of the reinforcement bracket is greater than a section length of the slot section.

14. The stabilizer bar device of claim 12, wherein the sub-rigid member is disposed so that a midpoint of the sub-rigid member in the longitudinal direction coincides with a midpoint of the main rigid member in the longitudinal direction.

15. The stabilizer bar device of claim 12, wherein the sub-rigid member comprises:
a fixing part coupled to the main rigid member;
a lever part having a first end coupled to the fixing part and disposed toward the slot hole along the longitudinal direction of the main rigid member; and
a blade part integral with a second end of the lever part and disposed in the slot hole at a predetermined distance from the fixing part along the longitudinal direction of the main rigid member via the lever part.

16. The stabilizer bar device of claim 15, wherein:
the fixing part is in a form of a pipe surrounding the main rigid member and is coupled to an outer peripheral surface of the main rigid member; and
the blade part is in a form of a flat plate configured to be inserted into the slot hole.

17. The stabilizer bar device of claim 15, further comprising damping members respectively arranged on both inner wall surfaces of the slot hole in the longitudinal direction, wherein the blade part is interposed therebetween.

18. The stabilizer bar device of claim 17, wherein the blade part is configured to come into close contact with one of the damping members along a torsion direction of the main rigid member.

19. The stabilizer bar device of claim 17, wherein the blade part is separated from each of the damping members by a predetermined gap.

20. The stabilizer bar device of claim 17, wherein the blade part is disposed in contact with the damping members.

* * * * *